(12) United States Patent
Bolz et al.

(10) Patent No.: US 10,134,169 B2
(45) Date of Patent: Nov. 20, 2018

(54) IMAGE LOADS, STORES AND ATOMIC OPERATIONS

(75) Inventors: Jeffrey A. Bolz, Santa Clara, CA (US); Patrick R. Brown, Wake Forest, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 1895 days.

(21) Appl. No.: 12/855,602

(22) Filed: Aug. 12, 2010

(65) Prior Publication Data

US 2011/0063318 A1  Mar. 17, 2011

Related U.S. Application Data

(60) Provisional application No. 61/241,847, filed on Sep. 11, 2009.

(51) Int. Cl.
| | |
|---|---|
| G06T 11/40 | (2006.01) |
| G06T 15/00 | (2011.01) |
| G06T 15/80 | (2011.01) |
| G06T 1/20 | (2006.01) |
| G09G 5/36 | (2006.01) |
| G06F 13/16 | (2006.01) |

(52) U.S. Cl.
CPC ............ *G06T 15/005* (2013.01); *G06T 1/20* (2013.01); *G06T 15/80* (2013.01); *G09G 5/363* (2013.01); *G06F 13/1605* (2013.01)

(58) Field of Classification Search
CPC ......... G06T 15/005; G06T 15/80; G06T 1/20; G09G 5/363; G06F 13/1605

USPC .......................... 345/552, 582, 558, 587, 538
See application file for complete search history.

(56) References Cited

U.S. PATENT DOCUMENTS

| | | | |
|---|---|---|---|
| 8,189,009 B1 * | 5/2012 | Brown | G06T 15/04 345/426 |
| 2005/0259104 A1 * | 11/2005 | Koguchi | 345/552 |
| 2009/0021522 A1 * | 1/2009 | Burley et al. | 345/582 |
| 2010/0091028 A1 * | 4/2010 | Grossman et al. | 345/587 |

* cited by examiner

*Primary Examiner* — Ke Xiao
*Assistant Examiner* — Kim-Thanh T Tran
(74) *Attorney, Agent, or Firm* — Artegis Law Group, LLP

(57) ABSTRACT

One embodiment of the present invention sets forth a method for accessing texture objects stored within a texture memory. The method comprises the steps of receiving a texture bind request from an application program, wherein the texture bind request includes an object identifier that identifies a first texture object stored in the texture memory and an image identifier that identifies a first image unit, binding the first texture object to the first image unit based on the texture bind request, receiving, within a shader engine, a first shading program command from the application program for performing a first memory access operation on the first texture object, wherein the memory access operation is a store operation or atomic operation to an arbitrary location in the image, and performing, within the shader engine, the first memory access operation on the first texture object via the first image unit.

23 Claims, 5 Drawing Sheets

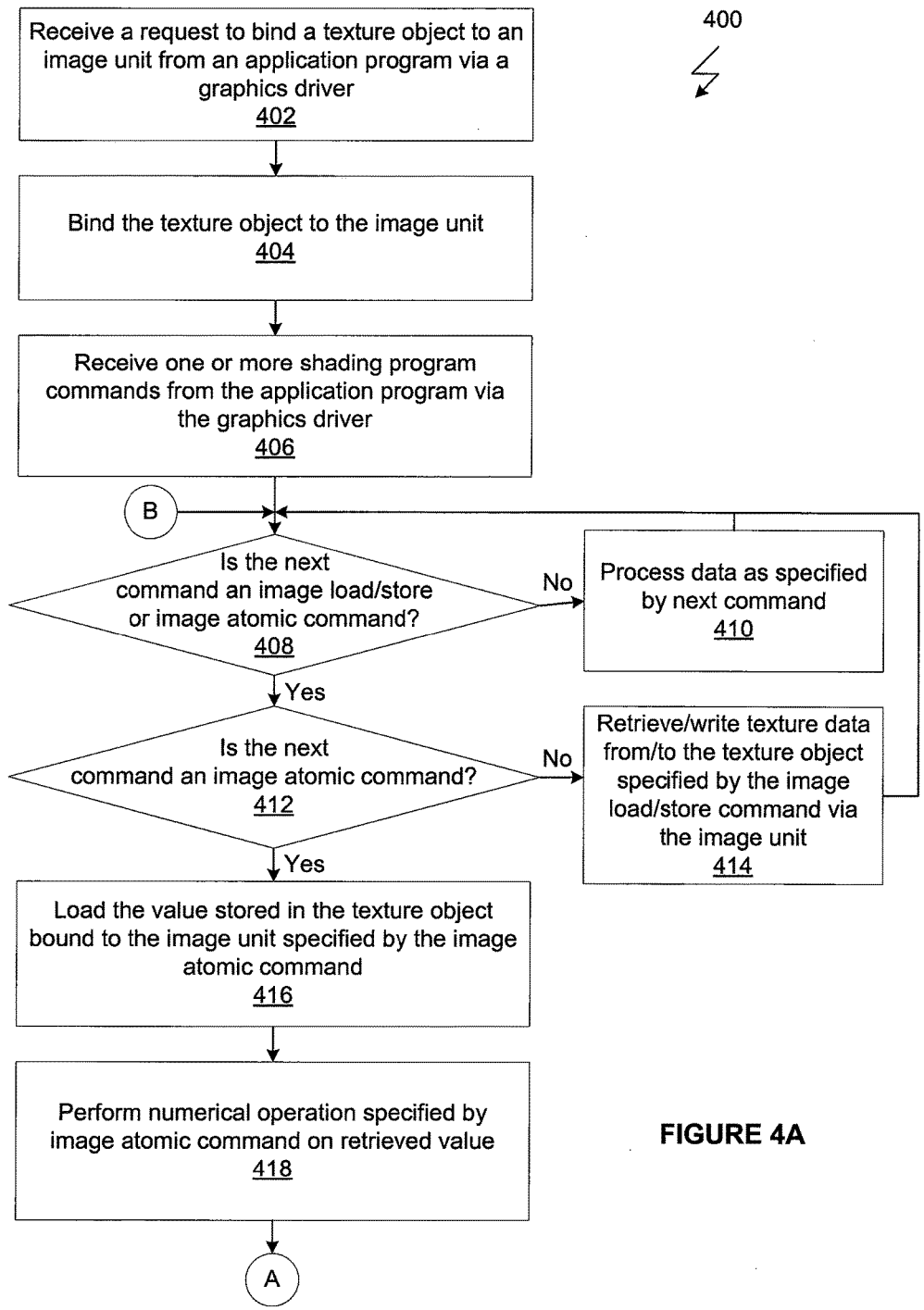

IMAGE LOADS, STORES AND ATOMIC OPERATIONS

CROSS-REFERENCE TO RELATED APPLICATIONS

This application claims benefit of U.S. provisional patent application entitled "API Extensions for Advanced Graphics Processing Units," filed on Sep. 11, 2009 and having a Ser. No. 61/241,847.

BACKGROUND OF THE INVENTION

Field of the Invention

The present invention relates generally to accessing buffer objects in GPU memory and, more specifically, to image loads, stores and atomic operations.

Description of the Related Art

A typical graphics pipeline includes several shader stages, and each shader stage executes commands specified by the application on data stored in buffer objects bound to the application context. Texture data generated by a typical graphics pipeline is composed of one or more "images" corresponding to distinct levels of detail ("LODs") of the texture, or faces of a cubemap. Texture data can only be written by outputs of the fragment shader stage, and only to the fragment location within the texture as determined by rasterization. One drawback to these limitations is that the flexibility available to programmers when programming subsequent shading passes of a rendering algorithm is reduced.

As the foregoing illustrates, what is needed in the art is a mechanism for updating texture data from within the different shader stages of a graphics pipeline other than the fragment shader stage.

SUMMARY OF THE INVENTION

One embodiment of the present invention sets forth a method for accessing texture objects stored within a texture memory. The method comprises the steps of receiving a texture bind request from an application program, wherein the texture bind request includes an object identifier that identifies a first texture object stored in the texture memory and an image identifier that identifies a first image unit, binding the first texture object to the first image unit based on the texture bind request, receiving, within a shader engine, a first shading program command from the application program for performing a first memory access operation on the first texture object, wherein the memory access operation is a store operation or atomic operation to an arbitrary location in the image, and performing, within the shader engine, the first memory access operation on the first texture object via the first image unit.

One advantage of the disclosed technique is that, via the image units, texture data can be loaded and stored from any shader stage within a graphics processing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A and 4B set forth a flow diagram of method steps for accessing a texture object via an attached image unit from within a shader engine, according to one embodiment of the present invention.

DETAILED DESCRIPTION

Figure 1:
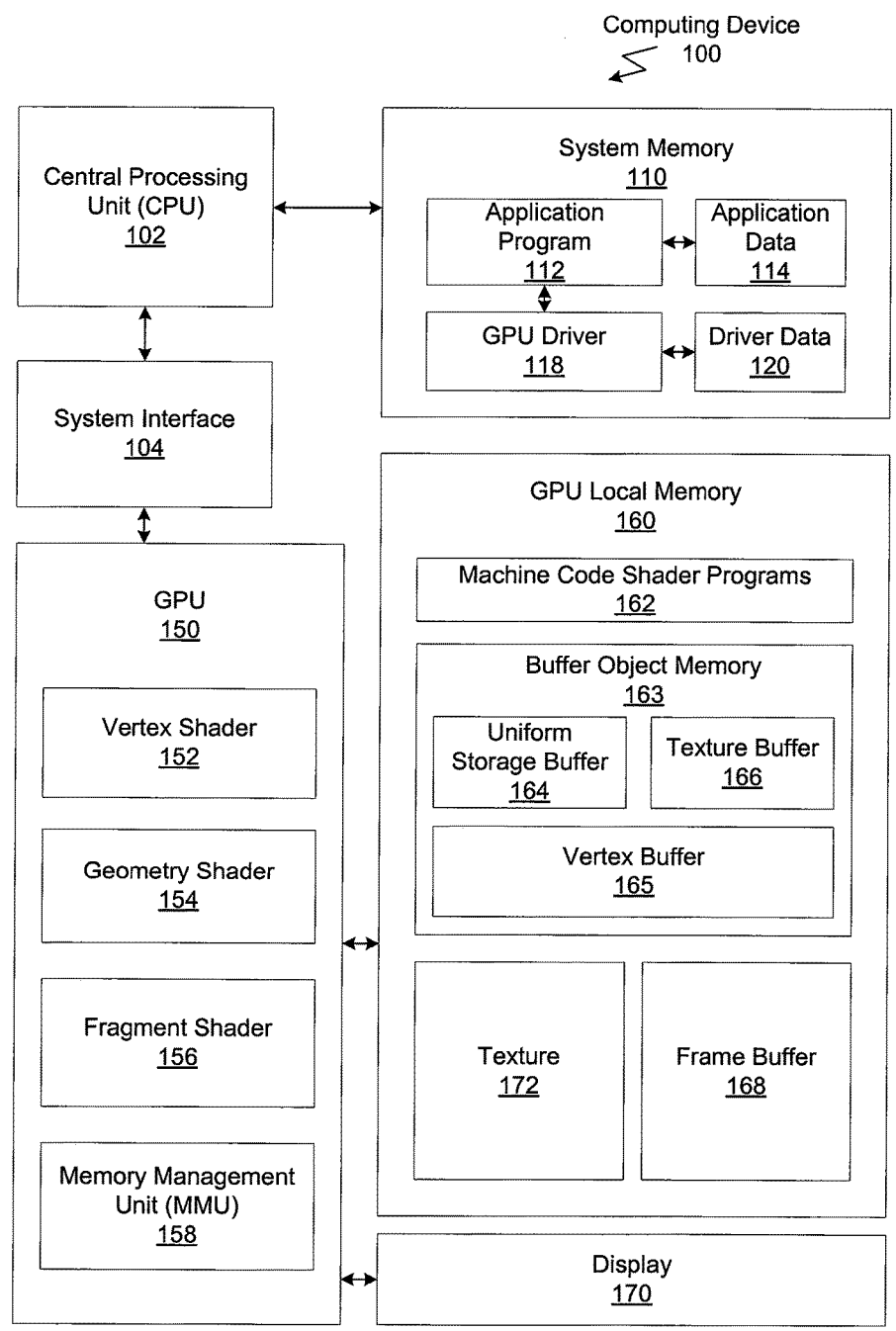
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more shading programs to the graphics API for processing within the GPU driver 118. The shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163 and a texture memory 171. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays. The vertex buffer 165 stores data elements describing the position and other attributes of vertices provided as inputs to the vertex shader 152.

The texture memory 172 and the frame buffer 168 include at least one two-dimensional surface that is used to drive the display 170. The frame buffer 168 may include more than one two-dimensional surfaces so that the GPU 150 can render to one two-dimensional surface while a second two-dimensional surface is used to drive the display 170. Data stored within the texture memory 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. Other embodiments of the GPU 150 include other shaders, such as tessellation shaders.

A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

The MMU 158 is configured to map virtual addresses into physical addresses. The MMU 158 includes a set of page table entries (PTEs) used to map a virtual address to a physical address of a page, and optionally includes a cache. The MMU 158 may include address translation lookaside buffers (TLB) or caches which may reside within the GPU 150. The physical address is processed to distribute surface data access locality to allow efficient request interleaving among partition units. The cache may be used to determine whether of not a request for a cache line is a hit or miss, improving the performance of the MMU.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
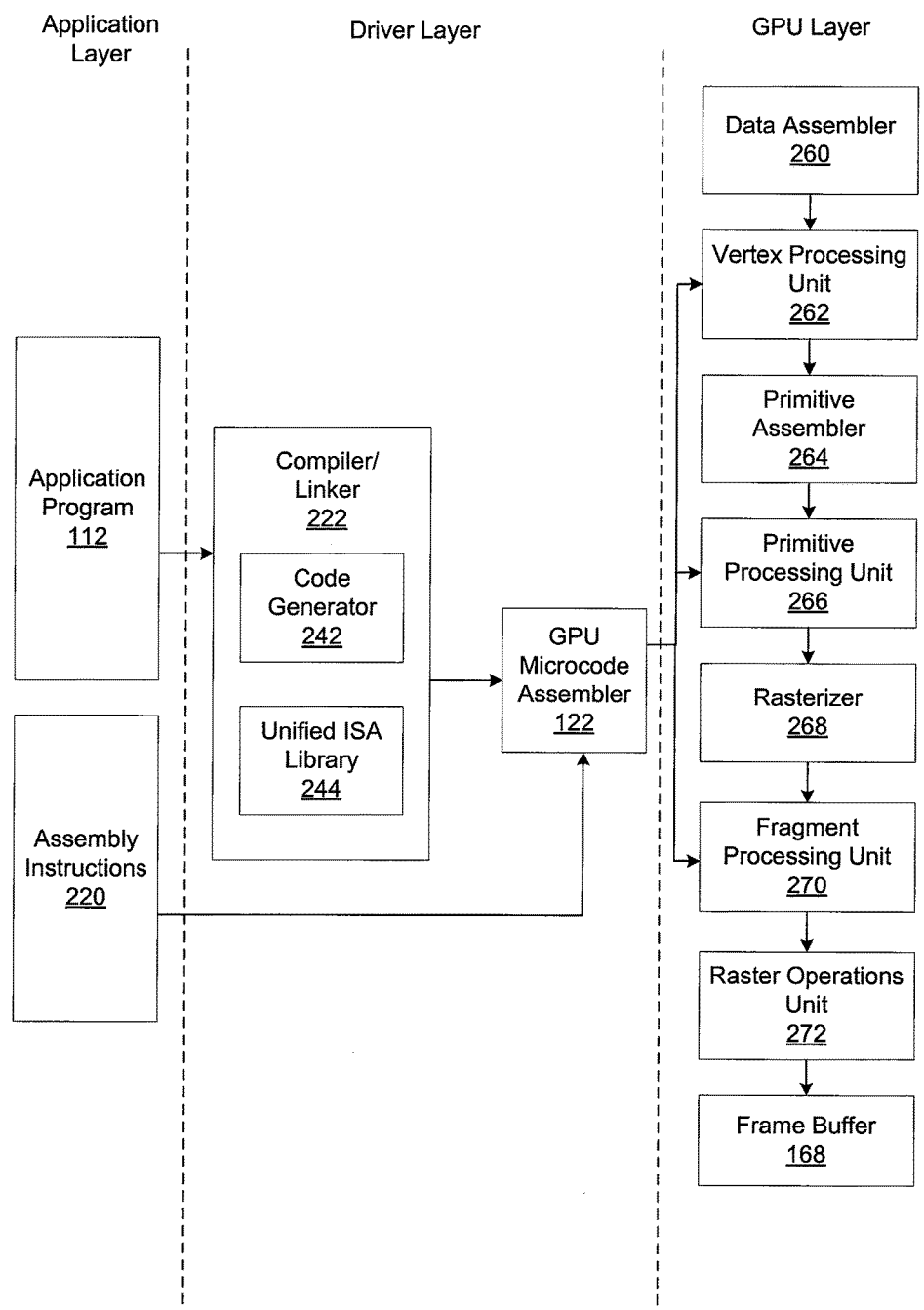
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
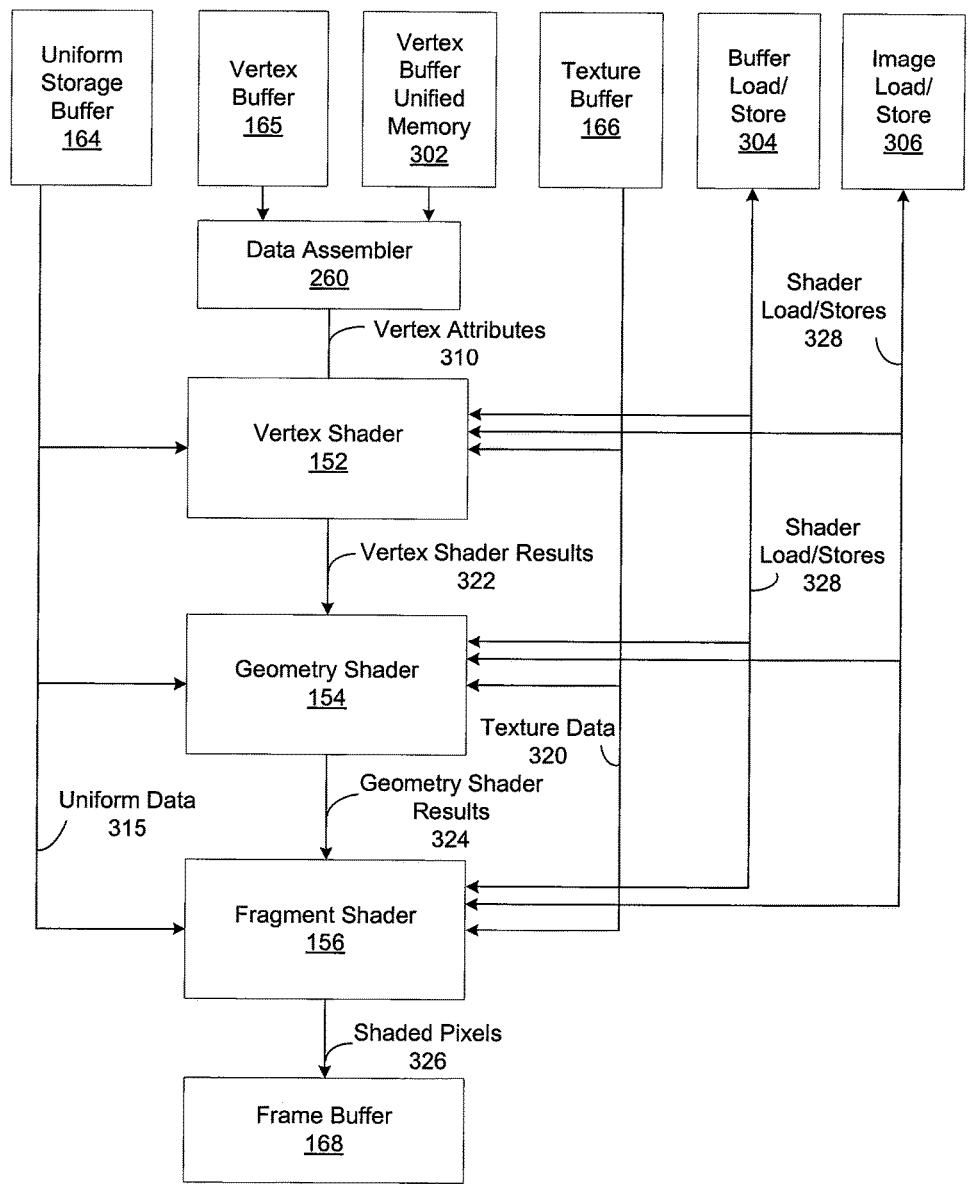
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164 and texture data 320 from the texture buffer 166. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164 and texture data 320 from the texture buffer 166. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164 and texture data 320 from the texture buffer 166. The output of the fragment shader 156 includes a stream of shaded pixels 326 that are written to the frame buffer 168.

In addition, each of the vertex shader 152, the geometry shader 154 and the fragment shader 156 may retrieve data from and write data to buffer objects stored within the buffer object memory 163 via the buffer load/store mechanism 304. Similarly, each of the vertex shader 152, the geometry shader 154 and the fragment shader 156 may retrieve texture data and write texture data to image units stored within texture memory 172 via the image load/store mechanism 306.

Accessing Texture Objects Via Image Units

The present invention is a mechanism for accessing texture objects within the texture memory 172 via image units to which those texture objects are attached. Each texture object stored in texture memory 172 comprises one or more images corresponding to distinct levels of detail ("LODs") of the texture, or faces of a cubemap. In operation, to access a texture object, one or more images corresponding to a particular LOD (referred to herein as "layers of the texture object") are first bound to image units available within the context associated with the application program 112. Each of the vertex shader 152, the geometry shader 154 and the fragment shader 156 can then access the texture object bound to the image units via the image load/store mechanism 306.

Figure 4B:
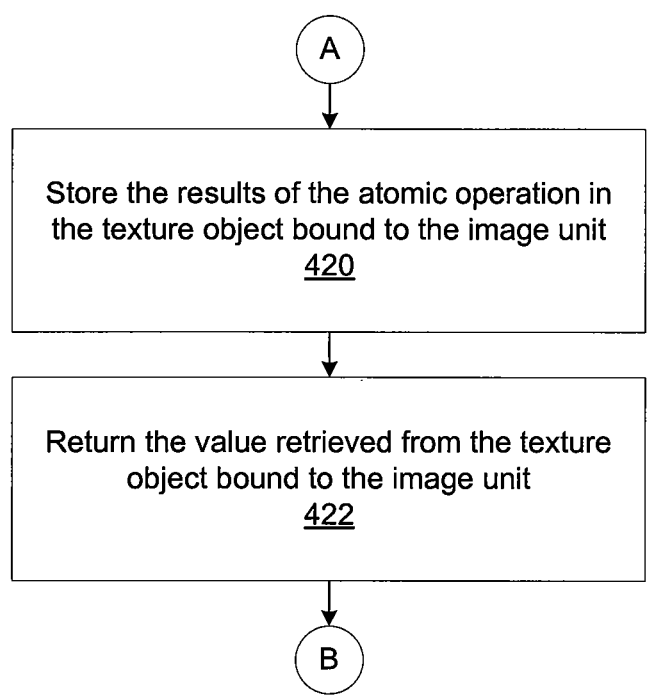

FIGS. 4A and 4B set forth a flow diagram of method steps for accessing a texture object via an attached image unit from within a shader engine. Although the method steps are described in conjunction with the systems for FIGS. 1-3, persons skilled in the art will understand that any system configured to perform the method steps, in any order, is within the scope of the invention.

At step 402, the application program 112 transmits a request to the GPU driver 118 to bind one or more layers of a particular level of detail of a texture object within the texture memory 172 to an image unit. The request received from the application program 112 identifies the texture object, the selected level of detail, a flag indicating if only a single layer should be bound, the particular layer to be bound (if the single layer flag is set), and an index associated with the image unit. In one embodiment, at least eight image units are available in the context associated with the application program 112 for binding to texture objects. The request also identifies the valid access type(s) that can be performed on the texture object via the image unit. Access types include reading from and writing to the texture object within the texture memory 172. At step 404, in response to the bind request, the GPU driver 118 binds the layer of the texture object identified in the bind request to the image unit.

At step 406, a shader stage, such as the vertex shader 152, geometry shader 154 or the fragment shader 156, receives one or more shading program commands from the application program 112 via the GPU driver 118. In operation, as previously described, shading program commands transmitted by the GPU driver 118 are processed within the GPU 150 and specify shader behavior of the different processing domains of the GPU 150. The one or more commands may include commands for performing vertex operations within the vertex shader 152, primitive operations within the geometry shader 154 or fragment operations within the fragment shader 156.

The one or more commands may also include a load/store command that specify a particular memory access operation via the buffer load/store mechanism 304, the image load/store mechanism 306 or any other mechanism described previously herein. The one or more commands may also include may also include an atomic command that specifies a numerical operation to be performed on data stored within the buffer object(s), texture objects or other memory portion specified by the atomic command. When an atomic command is executed within the vertex shader 152, the geometry shader 154 or the fragment shader 156, the result of the numerical operation is stored in memory portion specified by the atomic command. The set of atomic operations that may be performed include, but are not limited to:

32-bit float, integer, and unsigned integer, and 64-bit unsigned integer addition
32-bit integer and unsigned integer minimum
32-bit integer and unsigned integer maximum
32-bit unsigned integer increment with wrapping
32-bit unsigned integer decrement with wrapping
32-bit integer and unsigned integer bitwise AND
32-bit integer and unsigned integer bitwise OR
32-bit integer and unsigned integer bitwise XOR
32-bit integer and unsigned integer, and 64-bit unsigned integer exchange
32-bit integer and unsigned integer, and 64-bit unsigned integer compare and swap At step 408, if the next shading program command is an image load/store commands or an image atomic command, then the method proceeds to step 412. At step 412, if the next shading program command is an image atomic command, then at step 416, the shader stage loads the value from the texture object bound to the selected image unit specified by the image atomic command. At step 418, the shader stage performs the numerical operation specified by the image atomic command on the value loaded from the texture object at step 416. At step 420, the shader stage stores the result of the operation performed at step 418 in the texture object bound to the selected image unit. At step 422, the original value loaded from the texture object bound at step 416 is returned and made available to subsequent shading program commands.

At step 412, if the next shading program command is an image load/store command, then at step 414, the shader stage performs a memory access operation on the texture object bound to the image unit specified by the load/store command. The memory access operation may be a read operation where data is retrieved from the texture object via the image unit or a write operation where data is stored in the texture object via the image unit.

At step 408, if the next shading program command is not an image load/store command or an image atomic command, then the method proceeds to step 410. At step 410, the shader stage processes data as specified by the next shading program command.

The discussion set forth below describes the image uniforms, image units, instructions for binding image units to texture objects and instructions performing memory access and/or atomic operations on those texture objects in greater detail. The instructions for performing memory access and/or atomic operations described below are executed within the different shaders described with respect to FIG. 3.

Image uniforms are special uniforms used in the OpenGL Shading Language to identify a level of a texture to be read or written using image load, store, and atomic built-in functions. The value of an image uniform is an integer specifying the image unit accessed. Image units are numbered beginning at zero. In one embodiment, there is an implementation-dependent number of available image units (MAX_IMAGE_UNITS_NV). The error INVALID_VALUE is generated if a Uniform1i{v} call is used to set an image uniform to a value less than zero or greater than or equal to MAX_IMAGE_UNITS_NV, which would indicate a non-existent image unit.

Image uniforms have different types and the type of an image variable identifies the number of coordinates needed to address an individual texel in the texture level bound to the image unit. Importantly, only a single texture level bound to each image unit. There is no limit on the number of active images that maybe used by a program or by any particular shader. However, given that there is an implementation-dependent limit on the number of unique image units, the actual number of images that may be used by all shaders in a program type is limited.

The contents of a texture object may be made available for shaders to read and write by binding the texture to one of a collection of image units. In one embodiment, an array of image units numbered beginning with zero, with the total number of image units provided given by the implementation-dependent constant MAX_IMAGE_UNITS_NV, are provided. A texture may be bound to an image unit for use by image loads and stores by calling:

void BindImageTextureNV(uint index, uint texture, int level, boolean layered, int layer, enum access);

where <index> identifies the image unit, <texture> is the name of the texture, and <level> selects a single level of the texture. If <texture> is zero, <level> is ignored and the currently bound texture to image unit <index> is unbound. If <index> is less than zero or greater than or equal to MAX_IMAGE_UNITS_NV, or if <texture> is not the name of an existing texture object, the error INVALID_VALUE is generated. If the texture identified by <texture> is a one-dimensional array, two-dimensional array, three-dimensional, cube map, or cube map array texture, it is possible to bind either the entire texture level or a single layer of the texture level. If <layered> is TRUE, the entire level is bound. If <layered> is FALSE, only the single layer identified by <layer> will be bound. <access> specifies whether the texture bound to the image will be treated as READ_ONLY, WRITE_ONLY, or READ_WRITE. If a shader reads from an image unit with a texture bound as WRITE_ONLY, or writes to an image unit with a texture bound as READ_ONLY, the results of that shader operation are undefined and may lead to application termination. In one embodiment, before a memory access operations is performed on a texture object via an image, the type of the memory access operation is compared against the <access> enum associated with the image unit to determine whether that type of memory access operation is valid.

If a texture object bound to one or more image units is deleted by DeleteTextures, it is detached from each such image unit, as though BindImageTextureNV were called with <index> identifying the image unit an <texture> set to zero.

When a shader accesses the texture bound to an image unit using a built-in image load, store, or atomic function, the shader identifies a single texel by providing a one-, two-, or three-dimensional coordinate and possibly a sample number for multisample texture accesses. The coordinates provided are assembled into an (x,y,z,w) vector by taking the three coordinates provided as (x,y,z) and the sample number as w. If the built-in function does not accept three coordinates and/or a sample number, missing coordinates are filled with zero. The (x,y,z,w) vector is used to select an individual texel tau_i, tau_i_j, or tau_i_j_k according to the target of the texture bound to the image unit. If the texture target has layers or cube map faces, the layer or face number is taken from the <layer> argument if the texture is bound with <layered> set to FALSE. For cube map textures, the face is taken by mapping the layer number to a face.

If the individual texel identified for an image load, store, or atomic operation doesn't exist, the access is treated as invalid. Invalid image loads will return zero. Invalid image stores will have no effect. Invalid image atomics will not update any texture bound to the image unit and will return zero. An access is considered invalid if: no texture is bound to the selected image unit, the texture bound to the selected image unit is incomplete, the texture level bound to the image unit is less than the base level or greater than the maximum level of the texture, the texture bound to the image unit is bordered, the internal format of the texture bound to the image unit is unknown, the texture bound to the image unit has layers, is bound with <layered> set to TRUE, and the selected layer or cube map face does not exist, the texel tau_i, tau_i_j, or tau_i_j_k doesn't exist, the <x>, <y>, or <z> coordinate is not defined and is non-zero, or the texture bound to the image unit has layers, is bound with <layered> set to FALSE, and the corresponding coordinate is non-zero.

For textures without multiple samples per texel, the <w> coordinate indicating the sample is ignored. For textures with multiple samples per texel, the sample selected for an image load, store, or atomic is undefined if the <w> coordinate is negative or greater than or equal to the number of samples in the texture. If a shader performs an image load, store, or atomic operation using an image variable declared as an array, and if the index used to select an individual out of bounds is negative or greater than or equal to the size of the array, the results of the operation are undefined but may not lead to termination.

Accesses to textures bound to image units are either formatted or unformatted. For an unformatted image operation, the components of the texture are treated as packed into a single 8-, 16-, or 32-bit scalar, or a two- or four-component vector with 32-bit components. Formatted accesses are supported only for image stores. When doing a formatted store, a shader specifies a four-component (R,G,B,A) vector of type vec4, ivec4, or uvec4. Formatted stores update the selected texel in a manner identical to that used by TexSubImage3D, TexSubImage2D, or TexSubImage1D. The <data> argument is filled with the data to be stored, and the <format> and <type> arguments are interpreted according to the data type of the data to be stored. For vec4 data, <format> and <type> are RGBA and FLOAT. For ivec4 data, <format> and <type> are RGBA_INTEGER and INT. For uvec4 data, <format> and <type> are RGBA_INTEGER and UNSIGNED_INT.

Images are opaque handles to one-, two-, or three-dimensional images corresponding to all or a portion of a single level of a texture image bound to an image unit. Images may be aggregated into arrays within a shader (using square brackets [ ]) and can be indexed with general integer expressions. There are five types of image variables, corresponding to different types of textures:

image1DNV: a full one-dimensional texture level, a single layer of a one dimensional-array texture level, or a buffer texture;

image2DNV: a full two-dimensional or rectangle texture level, or a single layer/face of a three-dimensional, cube map, two-dimensional array, or cube map array texture level;

image3DNV: a full three-dimensional, cube map, one-dimensional array, two-dimensional array, or cube map array texture level;

image2DMSNV: a two-dimensional multisample or renderbuffer texture; and image2DMSArrayNV: a two-dimensional multisample array texture Image variables are used in the image load, store, and atomic functions.

Memory accesses to image variables declared using the "coherent" storage qualifier are performed coherently with similar accesses from other shader threads. In particular, when reading a variable declared as "coherent," the values returned will reflect the results of previously completed writes performed by other shader threads. When writing a variable declared as "coherent," the values written will be reflected in subsequent coherent reads performed by other shader threads. Memory accesses to image variables declared using the "volatile" storage qualifier must treat the underlying memory as though it could be read or written at any point during shader execution by some source other than the executing thread. When a volatile variable is read, its value must be re-fetched from the underlying memory, even if the thread performing the read had already fetched its value from the same memory once. When a volatile variable is written, its value must be written to the underlying memory, even if the compiler can conclusively determine that its value will be overwritten by a subsequent write. Since the external source reading or writing a "volatile" variable may be another shader thread, variables declared as "volatile" are automatically treated as coherent.

Image variables using one of the five image data types (image1DNV, image2DNV, image3DNV, image2DMSNV, and image2DMSArrayNV) may be used in the built-in shader image memory functions defined in this section to read and write individual texels of a texture. Each image variable is an integer scalar that references an image unit, which has a texture image attached. When image memory functions access memory, an individual texel in the image is identified using an i, (i,j), or (i,j,k) coordinate corresponding to the values of <coord>. For image2DMS and image2DMSArray variables corresponding to multisample textures, each texel may have multiple samples and an individual sample is identified using the integer <sample> parameter. The coordinates and sample number are used to select an individual texel in the manner described previously.

The following is a list of load operations supported using image variables and image units:
void imageLoad(image1DNV image, int coord, out iloadData_t data);
void imageLoad(image2DNV image, ivec2 coord, out iloadData_t data);
void imageLoad(image3DNV image, ivec3 coord, out iloadData_t data);
void imageLoad(image2DMSNV image, ivec2 coord, int sample, out iloadData_t data);
void imageLoad(image2DMSArrayNV image, ivec3 coord, int sample, out iloadData_t data).

These load operations load the texel at the coordinate <coord> from the image unit specified by <image>. For multisample loads, the sample number is given by <sample>. The loaded texel is returned in <data>. When <image>, <coord>, and <sample> identify a valid texel, the bits used to store the selected texel are copied to <data>.

The following is a list of store operations supported using image variables and image units:
void imageStore(image1DNV image, int coord, iloadData_t data);
void imageStore(image2DNV image, ivec2 coord, iloadData_t data);
void imageStore(image3DNV image, ivec3 coord, iloadData_t data);
void imageStore(image2DMSNV image, ivec2 coord, int sample, iloadData_t data);
void imageStore(image2DMSArrayNV image, ivec3 coord, int sample, iloadData_t data).

These store operations store the value of <data> into the texel at the coordinate <coord> from the image specified by <image>. For multisample stores, the sample number is given by <sample>. When <image>, <coord>, and <sample> identify a valid texel, the bits used to represent <data> are copied to the selected texel.

The following is a list of formatted store operations supported using image variables and image units:
void imageStoreFormatted(image1DNV image, int coord, gvec4 data);
void imageStoreFormatted(image2DNV image, ivec2 coord, gvec4 data);
void imageStoreFormatted(image3DNV image, ivec3 coord, gvec4 data);
void imageStoreFormatted(image2DMSNV image, ivec2 coord, int sample, gvec4 data);
void imageStoreFormatted(image2DMSArrayNV image, ivec2 coord, int sample, gvec4 data);

These formatted store operations convert the value of the four-component vector <data> to the representation used for texels in the image specified by <image>, and store the value into the texel at the coordinate <coord>. For multisample stores, the sample number is given by <sample>. The data type "gvec4" is used as a placeholder indicating any of "vec4", "ivec4", or "uvec4". The values given by <data> are treated as an (R,G,B,A) vector and converted to the internal representation of the components of texture. Components in <data> with no corresponding component in the texture are ignored. If the base data type (float, signed integer, unsigned integer) of <data> is incompatible with the base data type of the texels of <image>, the components of <data> will be re-interpreted according to the base data type of the texture. For example, the bits of an "ivec4" <data> will be re-interpreted as 32-bit floats when used to write to a floating-point texture. The converted texel is written to the texel derived from <coord> and <sample>.

The following is a list of atomic operations supported using image variables and image units:
uint imageAtomicAdd(IMAGE_INFO, uint data);
int imageAtomicAdd(IMAGE_INFO, int data);
float imageAtomicAdd(IMAGE_INFO, float data);
uint imageAtomicMin(IMAGE_INFO, uint data);
int imageAtomicMin(IMAGE_INFO, int data);
uint imageAtomicMax(IMAGE_INFO, uint data);
int imageAtomicMax(IMAGE_INFO, int data);
uint imageAtomicIncWrap(IMAGE_INFO, uint wrap);
uint imageAtomicDecWrap(IMAGE_INFO, uint wrap);
uint imageAtomicAnd(IMAGE_INFO, uint data);
int imageAtomicAnd(IMAGE_INFO, int data);
uint imageAtomicOr(IMAGE_INFO, uint data);
int imageAtomicOr(IMAGE_INFO, int data);
uint imageAtomicXor(IMAGE_INFO, uint data);
int imageAtomicXor(IMAGE_INFO, int data);

uint imageAtomicExchange(IMAGE_INFO, uint data);
int imageAtomicExchange(IMAGE_INFO, uint data);
uint imageAtomicCompSwap(IMAGE_INFO, uint compare, uint data);
int imageAtomicCompSwap(IMAGE_INFO, int compare, int data).

The "IMAGE_INFO" in the functions above is a placeholder representing five separate functions, each for a different type of image variable. The IMAGE_INFO" placeholder is replaced by one of the following arguments:

image1DNV image, int coord
    image2DNV image, ivec2 coord
    image3DNV image, ivec3 coord
    image2DMSNV image, ivec2 coord, int sample
    image2DMSArrayNV image, ivec3 coord, int sample.

As with image load and store functions, <image>, <coord>, and <sample> specify the the individual texel to operate on. The method for identifying the individual texel operated on from <image>, <coord>, and <sample>, and the method for reading and writing the texel are specified.

Each of the above-mentioned functions perform atomic operations on individual texels or samples of an image variable. Atomic memory operations read a value from the selected texel, compute a new value using one of the operations described below, writes the new value to the selected texel, and returns the original value read. The contents of the texel being updated by the atomic operation are guaranteed not to be updated by any other image store or atomic function between the time the original value is read and the time the new value is written.

imageAtomicAdd( ) computes a new value by adding the value of <data> to the contents of <address>. These functions support 32-bit unsigned integer operands, 32-bit signed integer operands, and 32-bit floating point operands.

imageAtomicMin( ) computes a new value by taking the minimum of the value of <data> and the contents of <address>. These functions support 32-bit signed and unsigned integer operands.

imageAtomicMax( ) computes a new value by taking the maximum of the value of <data> and the contents of <address>. These functions support 32-bit signed and unsigned integer operands.

imageAtomicIncWrap( ) computes a new value by adding one to the contents of <address>, and then forcing the result to zero if and only if the incremented value is greater than or equal to <wrap>. These functions support only 32-bit unsigned integer operands.

imageAtomicDecWrap( ) computes a new value by subtracting one from the contents of <address>, and then forcing the result to <wrap>-1 if the original value read from <address> was either zero or greater than <wrap>.

These functions support only 32-bit unsigned integer operands.

imageAtomicAnd( ) computes a new value by performing a bitwise and of the value of <data> and the contents of <address>. These functions support 32-bit signed and unsigned integer operands.

imageAtomicOr( ) computes a new value by performing a bitwise or of the value of <data> and the contents of <address>. These functions support 32-bit signed and unsigned integer operands.

imageAtomicXor( ) computes a new value by performing a bitwise exclusive or of the value of <data> and the contents of <address>. These functions support 32-bit signed and unsigned integer operands.

imageAtomicExchange( ) computes a new value by simply copying the value of <data>. These functions support 32-bit signed and unsigned integer operands.

imageAtomicCompSwap( ) compares the value of <compare> and the contents of <address>. If the values are equal, the new value is given by <data>; otherwise, it is taken from the original value loaded from the texel.

These functions support 32-bit signed and unsigned integer operands.

Any other technically feasible atomic functions are within the scope of the present invention.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A non-transitory computer-readable storage medium including instructions that, when executed by a processor, perform the steps of:

receiving a texture bind request from an application program, wherein the texture bind request includes an object identifier that identifies a first texture object stored in the texture memory and an image identifier that identifies a first image unit;

binding the first texture object to the first image unit based on the texture bind request;

receiving, within a shader engine, a first shading program command from the application program for performing a first memory access operation on the first texture object, wherein the first shading program command includes an image uniform variable that references the first image unit and has a first texture dimensionality, and wherein the memory access operation is a store operation or an atomic operation to an arbitrary location in the first image unit; and performing, within the shader engine, the first memory access operation on a texel included within the first texture object via the first image unit, wherein a format of coordinates of the texel is determined based on the first texture dimensionality.

2. The non-transitory computer-readable storage medium of claim 1, wherein the first texture object is a multi-layer texture object, and the texture bind request identifies one or more layers of the first texture object that are to be bound to the first image unit, wherein each layer corresponds to a different level of detail of the first texture object.

3. The non-transitory computer-readable storage medium of claim 1, wherein the texture bind request specifies one or more types of memory access operations that can be performed on the first texture object via the first image unit.

4. The non-transitory computer-readable storage medium of claim 3, wherein the step of performing the first memory access operation comprises determining that the first memory access operation is associated with one of the one or more types of memory access operations that can be performed on the first texture object.

5. The non-transitory computer-readable storage medium of claim 1, wherein the first memory access operation identifies a first portion of the first texture object.

6. The non-transitory computer-readable storage medium of claim 5, wherein the first memory access operation is a texture read operation, and the step of performing the first memory access operation comprises retrieving texture data from the first portion of the first texture object.

7. The non-transitory computer-readable storage medium of claim 5, wherein the first memory access operation is a texture write operation, and the step of performing the first memory access operation comprises writing texture data to the first portion of the first texture object.

8. The non-transitory computer-readable storage medium of claim 7, wherein the step of writing the texture data to the first portion comprises formatting the texture data according to a format specified by the texture bind request.

9. The non-transitory computer-readable storage medium of claim 5, wherein the first memory access operation is a texture atomic operation, and the step of performing the first memory access operation comprises:
loading texture data stored in the first portion of the texture object;
performing an arithmetic operation on the texture data;
writing the result of the arithmetic operation to the first portion of the first texture object; and
returning the texture data to the shader engine.

10. The non-transitory computer-readable storage medium of claim 5, wherein the first portion of the texture object is identified by a set of integer coordinates.

11. The non-transitory computer-readable storage medium of claim 1, wherein the shader engine is any shader engine included within a graphics processing pipeline.

12. The non-transitory computer-readable storage medium of claim 1, wherein the first image unit is selected according to a value computed by a second shading program command.

13. A method for accessing texture objects stored within a texture memory, the method comprising:
receiving a texture bind request from an application program, wherein the texture bind request includes an object identifier that identifies a first texture object stored in the texture memory and an image identifier that identifies a first image unit;
binding the first texture object to the first image unit based on the texture bind request;
receiving, within a shader engine, a first shading program command from the application program for performing a first memory access operation on the first texture object, wherein the first shading program command includes an image uniform variable that references the first image unit and has a first texture dimensionality, and wherein the memory access operation is a store operation or an atomic operation to an arbitrary location in the first image unit; and
performing, within the shader engine, the first memory access operation on a texel included within the first texture object via the first image unit, wherein a format of coordinates of the texel is determined based on the first texture dimensionality.

14. The method of claim 13, wherein the first texture object is a multi-layer texture object, and the texture bind request identifies one or more layers of the first texture object that are to be bound to the first image unit, wherein each layer corresponds to a different level of detail of the first texture object.

15. The method of claim 13, wherein the texture bind request specifies one or more types of memory access operations that can be performed on the first texture object via the first image unit.

16. The method of claim 13, wherein the first memory access operation identifies a first portion of the first texture object.

17. The method of claim 16, wherein the first memory access operation is a texture read operation, and the step of performing the first memory access operation comprises retrieving texture data from the first portion of the first texture object.

18. The method of claim 16, wherein the first memory access operation is a texture write operation, and the step of performing the first memory access operation comprises writing texture data to the first portion of the first texture object.

19. The method of claim 18, wherein the step of writing the texture data to the first portion comprises formatting the texture data according to a format specified by the texture bind request.

20. The method of claim 16, wherein the first memory access operation is a texture atomic operation, and the step of performing the first memory access operation comprises:
loading texture data stored in the first portion of the texture object;
performing an arithmetic operation on the texture data;
writing the result of the arithmetic operation to the first portion of the first texture object; and
returning the texture data to the shader engine.

21. The method of claim 13, wherein the shader engine is any shader engine included within a graphics processing pipeline.

22. A computer system, comprising:
a memory; and
a processor configured to:
receive a texture bind request from an application program, wherein the texture bind request includes an object identifier that identifies a first texture object stored in the texture memory and an image identifier that identifies a first image unit;
bind the first texture object to the first image unit based on the texture bind request;
receive, within a shader engine, a first shading program command from the application program for performing a first memory access operation on the first texture object, wherein the first shading program command includes an image uniform variable that references the first image unit and has a first texture dimensionality, and wherein the memory access operation is a store operation or an atomic operation to an arbitrary location in the first image unit; and
perform, within the shader engine, the first memory access operation on a texel included within the first texture object via the first image unit, wherein a format of coordinates of the texel is determined based on the first texture dimensionality.

23. The non-transitory computer-readable storage medium of claim 1, wherein the texture object has a second texture dimensionality.

\* \* \* \* \*